US009678937B2

(12) United States Patent
Parikh et al.

(10) Patent No.: US 9,678,937 B2
(45) Date of Patent: Jun. 13, 2017

(54) SINGLE CLICK IN A PARTIALLY PROTECTED CELL OF A TABLE

(71) Applicant: CA, Inc., New York, NY (US)

(72) Inventors: Ravish Mukesh Parikh, Hicksville, NY (US); Richa Navani, Hicksville, NY (US)

(73) Assignee: CA, Inc., Islandia, NY (US)

(*) Notice: Subject to any disclaimer, the term of this patent is extended or adjusted under 35 U.S.C. 154(b) by 146 days.

(21) Appl. No.: 14/657,295

(22) Filed: Mar. 13, 2015

(65) Prior Publication Data

US 2016/0267069 A1   Sep. 15, 2016

(51) Int. Cl.
*G06F 17/24*       (2006.01)

(52) U.S. Cl.
CPC .......... *G06F 17/245* (2013.01); *G06F 17/246* (2013.01)

(58) Field of Classification Search
None
See application file for complete search history.

(56) References Cited

U.S. PATENT DOCUMENTS

| 5,247,611 | A | * | 9/1993 | Norden-Paul | G06F 17/243 345/156 |
| 7,921,360 | B1 | * | 4/2011 | Sundermeyer | G06F 17/24 715/255 |
| 8,677,255 | B1 | * | 3/2014 | Mitnick | G06F 8/34 715/763 |
| 2004/0153974 | A1 | * | 8/2004 | Walker, Jr. | G06F 9/543 715/210 |
| 2005/0229101 | A1 | * | 10/2005 | Matveyenko | G06F 17/2247 715/234 |
| 2006/0206800 | A1 | * | 9/2006 | Agrawal | G06F 17/245 715/234 |
| 2007/0067710 | A1 | * | 3/2007 | Clark | G06F 17/246 715/234 |
| 2008/0120538 | A1 | * | 5/2008 | Kurz | G06F 17/30905 715/255 |
| 2015/0067463 | A1 | * | 3/2015 | Chin | G06F 17/245 715/212 |

* cited by examiner

*Primary Examiner* — Stephen Hong
*Assistant Examiner* — Sanchita Roy
(74) *Attorney, Agent, or Firm* — Stevens & Showalter, LLP

(57) ABSTRACT

Displaying a table in a user interface includes receiving data related to a position within the user interface selected by a user; determining a particular cell of the table corresponding to the position, wherein the particular cell includes an editable portion and a non-editable portion; and determining a particular location within the cell corresponding to the position. A determination is made whether the particular location corresponds to the editable portion of the particular cell; and, if so, positioning a cursor at the particular location; or when the particular location does not correspond to the editable portion of the particular cell, preventing editing at the particular location.

21 Claims, 5 Drawing Sheets

| LEVEL | SEGMENT | DATA |
|---|---|---|
| 1 | ▽QMODEL | 0000000VGRTBGRT |
| 2 | ▽QFACILTY | 001001Parker  Pod275 Parker Pond Rd.  GreenfieldMA01943-0123@ |
| 3 | ▽QTYPE | AAAAAAAAAAAAAAaaaaaa |
| 4 | QTYPEHST | BBBBBBBBBCCCCCCCCCC |
| 4 | QTYPEHST | CCCCCCDDDDEEEEEFFFFFeee |
| 4 | QTYPEQTY | DDDDDDDEEEEEFFFF |
| 4 | QTYPEQTY | XXXXZZYYYY |
| 3 | ▽QTYPE | BBRED NNNNN % − +692 |
| 4 | QTYPEHST | DDDDDGGGGIIIIAAAA |
| 3 | QTYPEQTY | EEEEBBBBBCCCCEEEE |
| 3 | QTYPEQTY | FFFFFFFFFEEEEEEE |
| 1 | QTYPEQTY | 00000001111DDDDS |
| 4 | ▵QTYPE | AUWWWWRRRRCCCC |
| 4 | ▽QTYPE | BBYYYYEEEL |
| 4 | QTYPEHST | GGGGGGGGGGHHHHHHHIIIIIIIIAAA |
| 3 | QTYPEHST | HHHHHBBBBCCCCCDDDDDAA |
| 4 | QTYPEHST | 2021545616516 |
| 4 | QTYPEHST | 6515613216 |
| 1 | QTYPEHST | 651561526 |
| 3 | QTYPEQTY | 541661562 |
| 3 | QTYPEQTY | 5165156168DDDFFGVR |
| 4 | QTYPEQTY | V5614E6FV18 |
| 2 | QPLANT | FE6V51E6F98V49 |
| 2 | QPLANT | D56V74EF98V49E1VF49E8F4V9E8V498EV |
| 2 | QTOTSALS | |

SINGLE CLICK IN A PARTIALLY PROTECTED CELL OF A TABLE

BACKGROUND

The present disclosure relates to graphical user interfaces and, more specifically, to displaying tabular information.

In computer programming, a user interface can present information to a user via a variety of different methods and techniques. One particular format for presenting information can include a table that provides multiple rows of information. In many instances, each of the rows includes a number of separate, different elements. Such elements can be referred to as a "cell" of the table.

In many instances, a structure of the table is developed separately from the data that is eventually used to fill the table which is then displayed for the user. In other words, the table can have a plurality of rows each having a plurality of cells and then data can be retrieved to populate each of the cells for display to a user.

The table can be displayed to the user for a variety of different reasons and can, in some instances, permit the user to insert, edit, delete, or update data into one or more cells of the table. The table, however, may include some data which the user is not allowed to edit. Accordingly, one or more of the cells of a row can be configured to not permit the user to edit that cell. Thus, no data within that cell of the table can be changed. Other cells may contain data that the user is allowed to change and the user is not prevented from editing those cells. Thus, each cell of the table is configured to either allow the user to change anything within that cell or to prevent the user from changing anything within that cell.

BRIEF SUMMARY

According to one aspect of the present disclosure, a computer program product for displaying a table in a user interface includes a non-transitory computer readable storage medium having computer readable program code embodied therewith. In particular, the computer readable program code includes computer readable program code configured to receive data related to a position within the user interface selected by a user; and computer readable program code configured to determine a particular cell of the table corresponding to the position, wherein the particular cell comprises an editable portion and a non-editable portion. The program code also includes computer readable program code configured to determine a particular location within the cell corresponding to the position; computer readable program code configured to determine whether the particular location corresponds to the editable portion of the particular cell; computer readable program code configured to position a cursor at the particular location, when the particular location corresponds to the editable portion of the particular cell; and computer readable program code configured to prevent editing at the particular location when the particular location does not correspond to the editable portion of the particular cell.

According to another aspect of the present disclosure, a computer-implemented method for displaying a table in a user interface includes receiving, by an application executing on a computer, data related to a position within the user interface selected by a user; determining a particular cell of the table corresponding to the position, wherein the particular cell comprises an editable portion and a non-editable portion; and determining a particular location within the cell corresponding to the position. The method also includes determining whether the particular location corresponds to the editable portion of the particular cell; and when the particular location corresponds to the editable portion of the particular cell, positioning a cursor at the particular location; or when the particular location does not correspond to the editable portion of the particular cell, preventing editing at the particular location.

According to yet another aspect of the present disclosure, a system for displaying a table in a user interface includes a computer configured to execute an application comprising a plurality of executable instructions in an accessible memory. In particular, the computer when executing instructions stored in the accessible memory: a) receives data related to a position within the user interface selected by a user; b) determines a particular cell of the table corresponding to the position, wherein the particular cell comprises an editable portion and a non-editable portion; c) determines a particular location within the cell corresponding to the position; and d) determines whether the particular location corresponds to the editable portion of the particular cell. The computer also positions a cursor at the particular location, when the particular location corresponds to the editable portion of the particular cell, or prevents editing at the particular location when the particular location does not correspond to the editable portion of the particular cell.

BRIEF DESCRIPTION OF THE DRAWINGS

Aspects of the present disclosure are illustrated by way of example and are not limited by the accompanying figures with like references indicating like elements.

FIGS. 3A and 3B depict two example displays of a table in accordance with the principles of the present disclosure.

DETAILED DESCRIPTION

Figure 1:
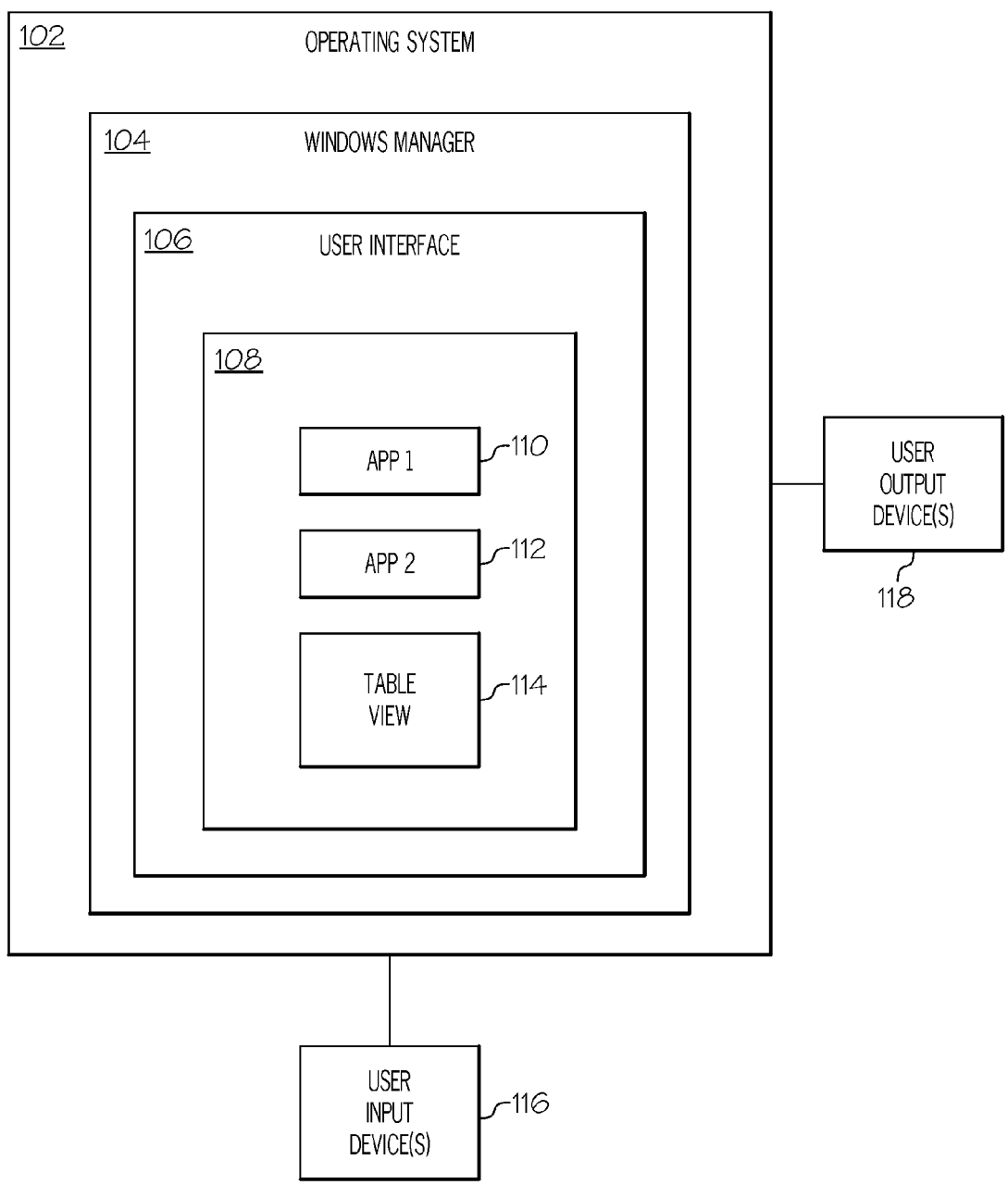
FIG. 1 illustrates an example operating environment for a table viewing application in accordance with the principles of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or by combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In accordance with the principles of the present disclosure, a table of information is presented to a user, wherein the table includes a number of different rows with each row having one or more different cells. In particular, the table is presented in such a way that a particular one of the cells can include an editable portion and a non-editable portion. When a user uses a mouse or other input device to select that cell, a cursor can be positioned in the cell to allow editing of the editable portion or the cursor could be prevented from being moved to the non-editable portion. One of ordinary skill would also recognize that the cursor could alternatively be moved to the non-editable portion of the cell selected by the user but that the user is prevented from making any changes. As one example, a visual appearance of the cursor within that cell could provide an indication to the user whether or not the cursor was located at an editable portion of the cell or at a non-editable portion of the cell. According to one particular aspect of the present disclosure, the user can use a mouse (or similar device) and position the cursor within a cell and provide a mouse-click, or similar input, to indicate a desire to select that cell. If the cursor is at an editable portion of the cell, then the cell is selected and editing is enabled. Thus, with a single mouse-click, a portion of the cell is both selected and ready to be edited without any further input (e.g., mouse click, double-click, keyboard selection, etc.) from the user.

FIG. 1 illustrates an example operating environment for a table viewing application in accordance with the principles of the present disclosure. The functional elements of FIG. 1 are shown, by way of example, as separate entities; however, one of ordinary skill will recognize that one or more for the functional elements could be combined together as well. In general, an operating system 102 is provided on a computing platform or computer system that provides a communication pathway between user applications and hardware elements (physical or virtualized) of the computer system such as user input devices 116 and user output devices 118. The operating system 102, or a windows manager 104, can be provided that manages presentation of a user interface 106. For example, the user interface 106 can include a window 108 that is used to present different applications 110, 112, 114.

In managing the user interface 106, the windows manager 104 can maintain information about the display location of each application 110, 112, 114 within the window 108, the sizes of each of the displayed applications 110, 112, 114, and whether they overlap. The windows manager 104 (in conjunction with the user interface 106) can also determine where a user has moved, or is moving a cursor, and then determine when the user has provided a "selection" input such as a mouse click, a double-click, or a keyboard input. Based on those determinations, the windows manager 104 can determine which of the applications 110, 112, 114 has been selected by the user and focus can be passed to that selected application so that subsequent input from the user can be handled by the selected application.

When a mouse-click event, for example, is detected by the windows manager 104, or the user interface 106, that event can be associated with a position, or coordinates, within the window 108 of the user interface 106 where the cursor is located when the event is detected. That position information, or coordinates, can then be communicated to the selected application (e.g., 110, 112, 114).

Figure 3A:
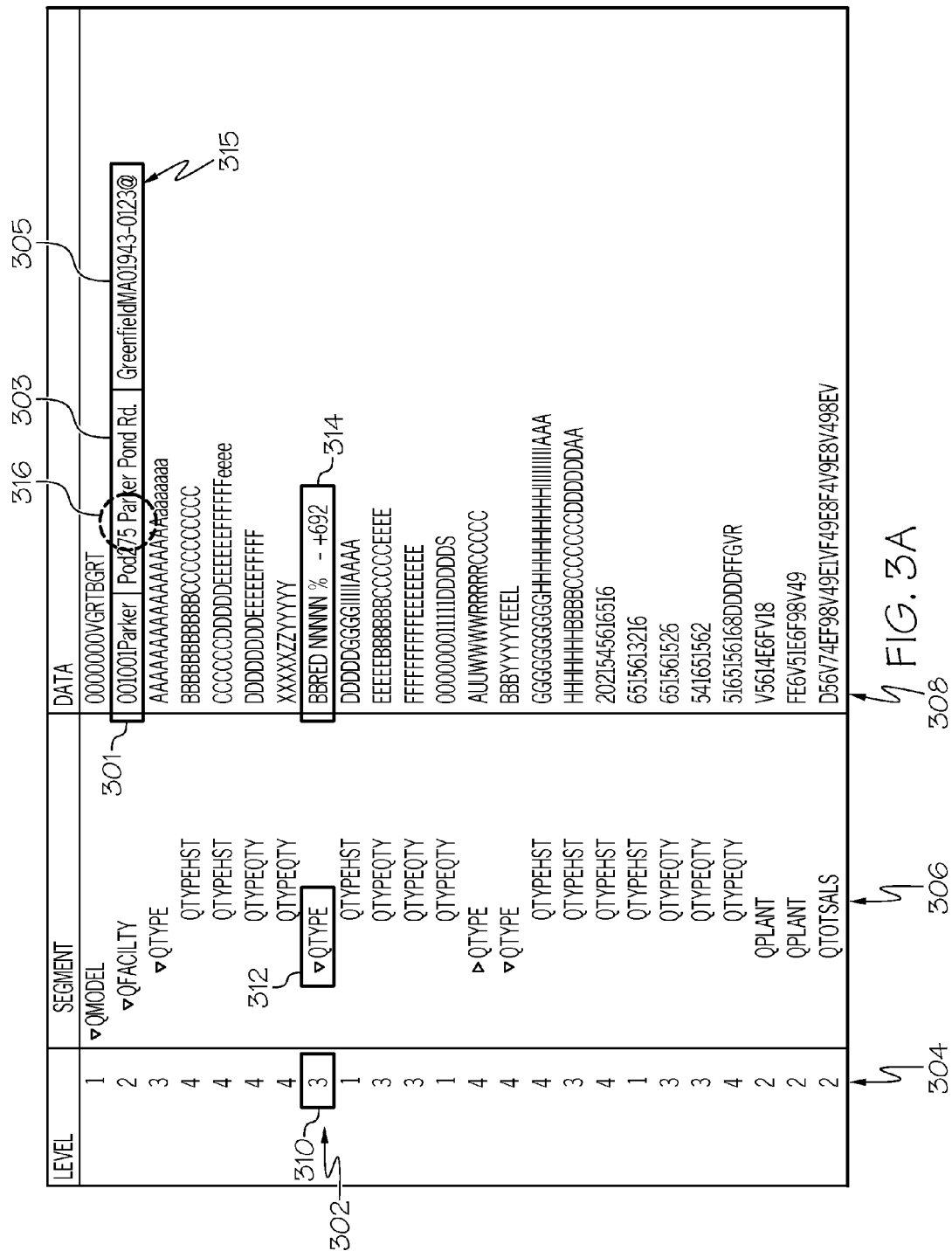

As described more fully below, one of the applications displayed in the window 108 can be a table viewer application 114 that displays a table having a plurality of rows wherein each row can include one or more individual cells. FIGS. 3A and 3B depict two example displays of a table in accordance with the principles of the present disclosure. Referring to FIG. 3A, the displayed table can include multiple rows 302 and multiple columns 304, 306, 308. The intersection of a particular row 302 and particular columns 304, 306, 308 define individual cells 310, 312, 314 of the table of FIG. 3A. Each of the cells 310, 312, 314 can be populated with appropriate data accessible by the table viewer application 114 and displayed within the window 108.

In performing its function of displaying data, the table viewer application 114 maintains a variety of different information related to that display. For example, the table viewer application 114 maintains an identification of the first row that happens to be currently displayed and the last row. In this manner, a vertically scrolling display of the table can be provided that automatically removes rows from the top of the display and adds rows to the bottom of the display as the table scrolls. Similarly, information to provide horizontal scrolling can be maintained as well. The table viewer application 114 can also maintain information about the font being used so that a respective location of each row 302 can be determined and a respective location of each displayed character within the row 302 can be determined. This location information for each displayed row and each displayed character can be relative to an origin reference location of the table shown in FIG. 3A or can be relative to an origin reference location of the window 108 of the user interface 106.

As described below, the table viewer application can, in addition to retrieving and displaying data, also maintain information about editable portions of each of the different cells 310, 312, 314 that are displayed. For example, every row of the table may have the same number of columns (and, thus, the same number of cells). For a particular row 302, the table viewer application 114 may determine that the row includes three different cells 310, 312, 314 each having a predetermined number of characters. The table viewer application 114 may also maintain information, for example, that the first five character positions of the third column of every row (e.g., the cell 314) are editable and that any remaining character positions are non-editable. The table viewer application 114 can maintain the information about editable regions of a cell by a variety of different ways:

a) information about editable character positions of a cell can be maintained and any other character positions are, by default, considered to be non-editable;

b) information about non-editable character positions of a cell can be maintained and any other character positions are, by default, considered to be editable; or c) explicit information about which character positions are editable and which character position are non-editable in a cell can be maintained.

The table viewer application 114 can determine the above information periodically as the display of the table of FIG. 3A is affected by user interaction. For example, when the user scrolls so that 25 separate rows are displayed in the table, then the table viewer application 114 can determine which rows are displayed and, thus, which cells are currently being displayed to the user. For each of these displayed cells, the table viewer application can determine the editable portions and the non-editable portions.

The determination of the editable and non-editable portions can be accomplished using a variety of different information. If each row of the table has the same number of columns, then for a particular column, the definition of the editable portion can indicate which character positions of that column are editable. If the rows can be of different formats, the definition of the editable portion can indicate which columns are displayed for a particular row format and then which character position are the editable character positions in each of those different columns. If there are a set of different cell formats and each row is constructed by a combination of different cells into the row, then the definition of the editable portion can indicate which character positions within a particular type, or format, of cell are editable. Thus, in whichever row that cell is displayed in, the table viewer application will be able to determine which character positions are editable by identifying that particular cell format. In some instances, the data displayed in a cell might determine whether or not certain character positions are editable. For example, if the first three characters of the data retrieved to populate a cell match a specified pattern, then one or more character positions within that cell may be defined as editable or non-editable. Accordingly, there may be instances in which a character position of a displayed cell is otherwise editable but the data actually displayed in that cell overrides that definition and makes those character positions protected, or non-editable.

Figure 2:
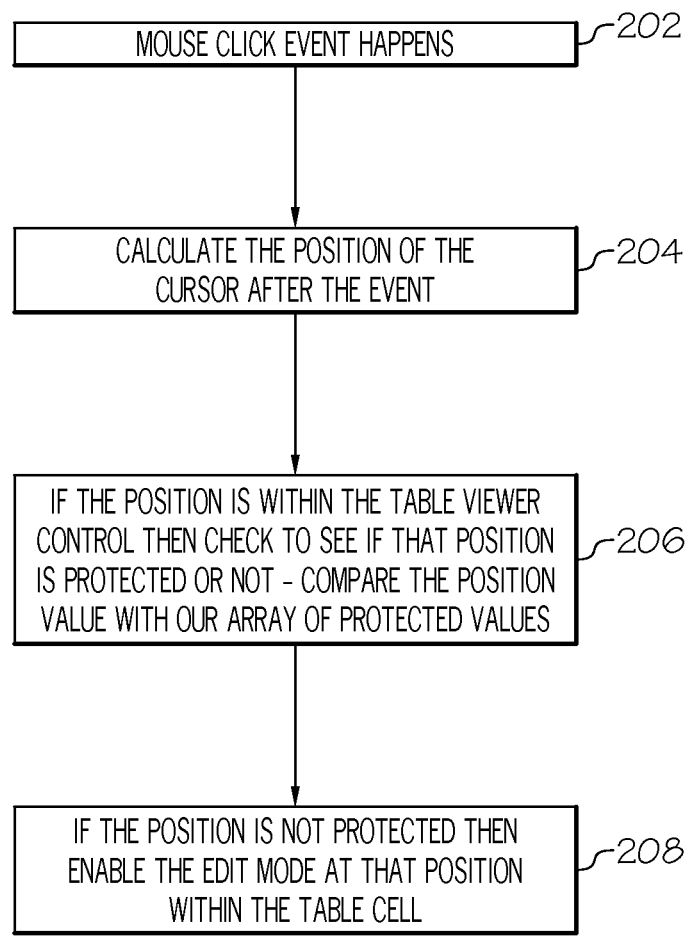
FIG. 2 depicts a flowchart of an example process for displaying a table in accordance with the principles of the present disclosure.

FIG. 2 depicts a flowchart of an example process for displaying a table in accordance with the principles of the present disclosure. In step 202 a mouse event is detected and, in step 204, a position within a display window (e.g. window 108 of user interface 106) can be calculated. Assuming that the position within the display window is associated with the table viewer application 114, data related to that position information is passed to the table viewer application 114.

The table viewer application 114 can then use the data it received about the position information to determine a particular cell being displayed corresponding to that position information and, furthermore, to determine a particular location (e.g., character position) within that cell corresponding to the position information. Thus, in step 206, the table viewer application 114 can use the character position, or particular cell location information, to determine if it corresponds to an editable or non-editable portion of the cell based on the information maintained about the various cells being displayed.

If the selected cell location is editable, then, in step 208, the cursor can be located at that location within the cell with an edit mode being enabled. Thus, with a single click a user can be presented with a table cell that is enabled for editing without any additional input. If the selected cell location is non-editable, then a) the focus could be applied to the table viewer application 114 but no cursor would be displayed, b) the cursor could be displayed but at a nearest editable location within the selected cell, or c) the cursor could be displayed at the selected location but in a visually distinct manner indicating that editing is not enabled.

As mentioned earlier, FIGS. 3A and 3B depict two example displays of a table in accordance with the principles of the present disclosure. In particular, in FIG. 3A, a cell 315 is depicted in the second row of data being displayed. The cell 315 can include an editable portion 303 and non-editable portions 301, 305. Thus, if a user selects, or clicks, on one of the character positions within the region 316, then the cursor is moved to cell 315 (at location 316) and editing of the cell 315 is enabled at that location. If, however, as shown in FIG. 3B, the user selects one of the character positions within location 318, then the user is prevented from editing that portion of the cell 315. Accordingly, the cell 315 is not entirely editable nor entirely protected but includes both an editable portion and a non-editable portion.

In accordance with aspects of the present disclosure, a computer-implemented method for displaying a table in a user interface includes receiving, by an table-displaying application executing on a computer, data related to a position within the user interface selected by a user and determining by that application a particular cell of the table corresponding to the position and a particular location within the cell corresponding to the position. In particular, the particular cell has both an editable portion and a non-editable portion and the table-displaying application determines whether the particular location corresponds to the editable portion of the particular cell. When the particular location corresponds to the editable portion of the particular cell, the table displaying application positions a cursor at the particular location; and when the particular location does not correspond to the editable portion of the particular cell, the application prevents editing at the particular location.

Figure 4:
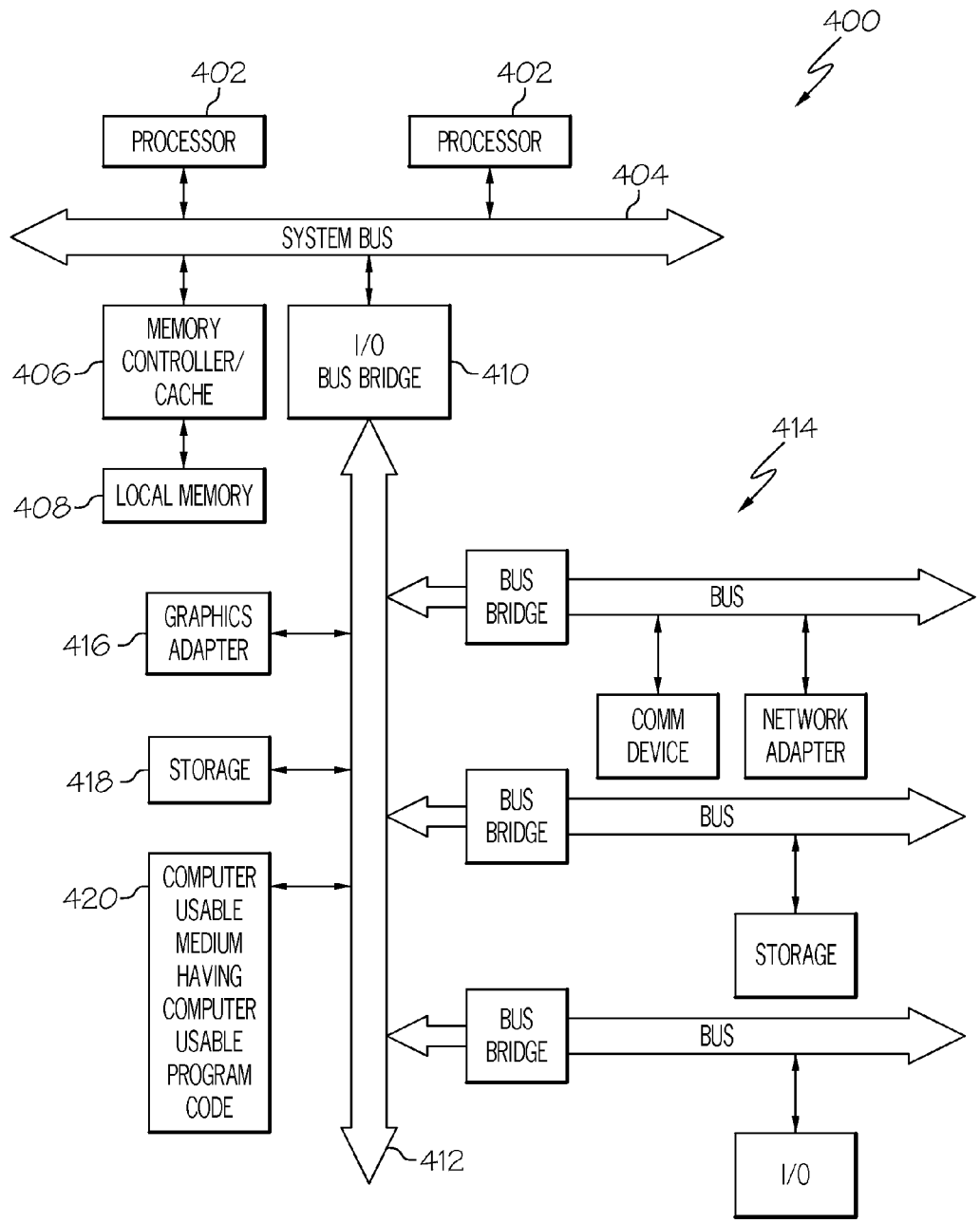
FIG. 4 is a block diagram of a data processing system in accordance with the principles of the present disclosure.

Referring to FIG. 4, a block diagram of a data processing system is depicted in accordance with the present disclosure. A data processing system 400, such as may be utilized to implement the computer or aspects thereof, e.g., as set out in greater detail in FIG. 1-FIG. 3B, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more buses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3B.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A computer-implemented method for displaying a table in a user interface, comprising:
    displaying, by an application executing on a computer, the table in the user interface;
    receiving, by the application executing on the computer, data related to a position within the user interface selected by a user;
    determining, by the application executing on the computer, a particular cell of the table corresponding to the position,
        wherein the particular cell comprises an editable portion comprising a first set of character positions, and a non-editable portion comprising a second set of character positions;
    determining, by the application executing on the computer, a particular location within the cell corresponding to the position;
    determining, by the application executing on the computer, whether the particular location corresponds to the editable portion of the particular cell;
    when the particular location corresponds to the editable portion of the particular cell, positioning, by the application executing on the computer, a cursor at the particular location; and when the particular location does not correspond to the editable portion of the particular cell, preventing, by the application executing on the computer, editing at the particular location.

2. The method of claim 1, comprising:
receiving, by the application executing on the computer, user input; and
modifying, by the application executing on the computer, contents of the particular cell at the particular location based on the user input.

3. The method of claim 1, wherein:
the first set of character positions comprises a plurality of non-contiguous character positions within the particular cell.

4. The method of claim 1, wherein determining the particular cell of the table comprises:
determining a particular row of the table, from amongst a plurality of rows, each row comprising a plurality of cells.

5. The method of claim 1, wherein determining the particular cell of the table comprises:
determining, by the application executing on the computer, a size of the table displayed within the user interface; and
determining, by the application executing on the computer, a size of each character in the table.

6. The method of claim 1, wherein determining whether the particular location corresponds to the editable portion of the particular cell, comprises:
comparing the particular location with a predetermined list having data which relates to an identification of the non-editable portion of the table.

7. The method of claim 1, wherein determining whether the particular location corresponds to the editable portion of the particular cell, comprises:
comparing the particular location with a predetermined list having data which relates to an identification of the editable portion of the table.

8. The method of claim 1, wherein the user interface comprises a plurality of windows, each window corresponding to a different, respective executing application.

9. The method of claim 1, comprising:
receiving, by the application executing on the computer, notification of a single mouse click event,
wherein the single mouse click event includes the data related to the position within the user interface selected by the user.

10. The method of claim 9, comprising:
after receiving notification of the single mouse click event, determining, by the application executing on the computer, the particular cell of the table corresponding to the position.

11. A system for displaying a table in a user interface on a computing device, comprising:
a memory device storing executable code;
a processor in communication with the memory device, wherein the executable code, when executed by the processor, causes the processor to:
display the table in the user interface on the computing device;
receive data related to a position within the user interface selected by a user;
determine a particular cell of the table corresponding to the position,
wherein the particular cell comprises an editable portion comprising a first set of character positions and a non-editable portion comprising a second set of character positions;
determine a particular location within the cell corresponding to the position;
determine whether the particular location corresponds to the editable portion of the particular cell;
position a cursor at the particular location, when the particular location corresponds to the editable portion of the particular cell; and
prevent editing at the particular location when the particular location does not correspond to the editable portion of the particular cell.

12. The system of claim 11, wherein the executable code, when executed by the processor, causes the processor to:
receive user input; and
modify contents of the particular cell at the particular location based on the user input.

13. The system of claim 11, wherein:
the first set of character positions comprises a plurality of non-contiguous character positions within the particular cell.

14. The system of claim 11, wherein the executable code, when executed by the processor, causes the processor to:
determine a particular row of the table, from amongst a plurality of rows, each row comprising a plurality of cells.

15. The system of claim 11, wherein the executable code, when executed by the processor, causes the processor to:
determine a size of the table displayed within the user interface; and
determine a size of each character in the table.

16. The system of claim 11, wherein the executable code, when executed by the processor, causes the processor to:
compare the particular location with a predetermined list having data which relates to an identification of the non-editable portion of the table.

17. The system of claim 11, wherein the executable code, when executed by the processor, causes the processor to:
compare the particular location with a predetermined list having data which relates to an identification of the editable portion of the table.

18. The system of claim 11, wherein the user interface comprises a plurality of windows, each window corresponding to a different, respective executing application.

19. The system of claim 11, wherein the executable code, when executed by the processor, causes the processor to:
receive notification of a single mouse click event,
wherein the single mouse click event includes the data related to the position within the user interface selected by the user.

20. The system of claim 19, wherein the executable code, when executed by the processor, causes the processor to:
determine the particular cell of the table corresponding to the position, after receiving notification of the single mouse click event.

21. A non-transitory computer-readable medium having instructions stored thereon that are executable by a computing device to perform operations comprising:
displaying a table in a user interface;
receiving data related to a position within the user interface selected by a user;
determining a particular cell of the table corresponding to the position, wherein the particular cell comprises an editable portion comprising a first set of character positions, and a non-editable portion comprising a second set of character positions;

determining a particular location within the cell corresponding to the position;

determining whether the particular location corresponds to the editable portion of the particular cell;

positioning a cursor at the particular location, when the particular location corresponds to the editable portion of the particular cell; and preventing editing at the particular location when the particular location does not correspond to the editable portion of the particular cell.

* * * * *